Sept. 25, 1956   K. R. CHURNSIDE ET AL   2,764,446
BUMPER JACK SAFETY DEVICE
Filed Aug. 21, 1953
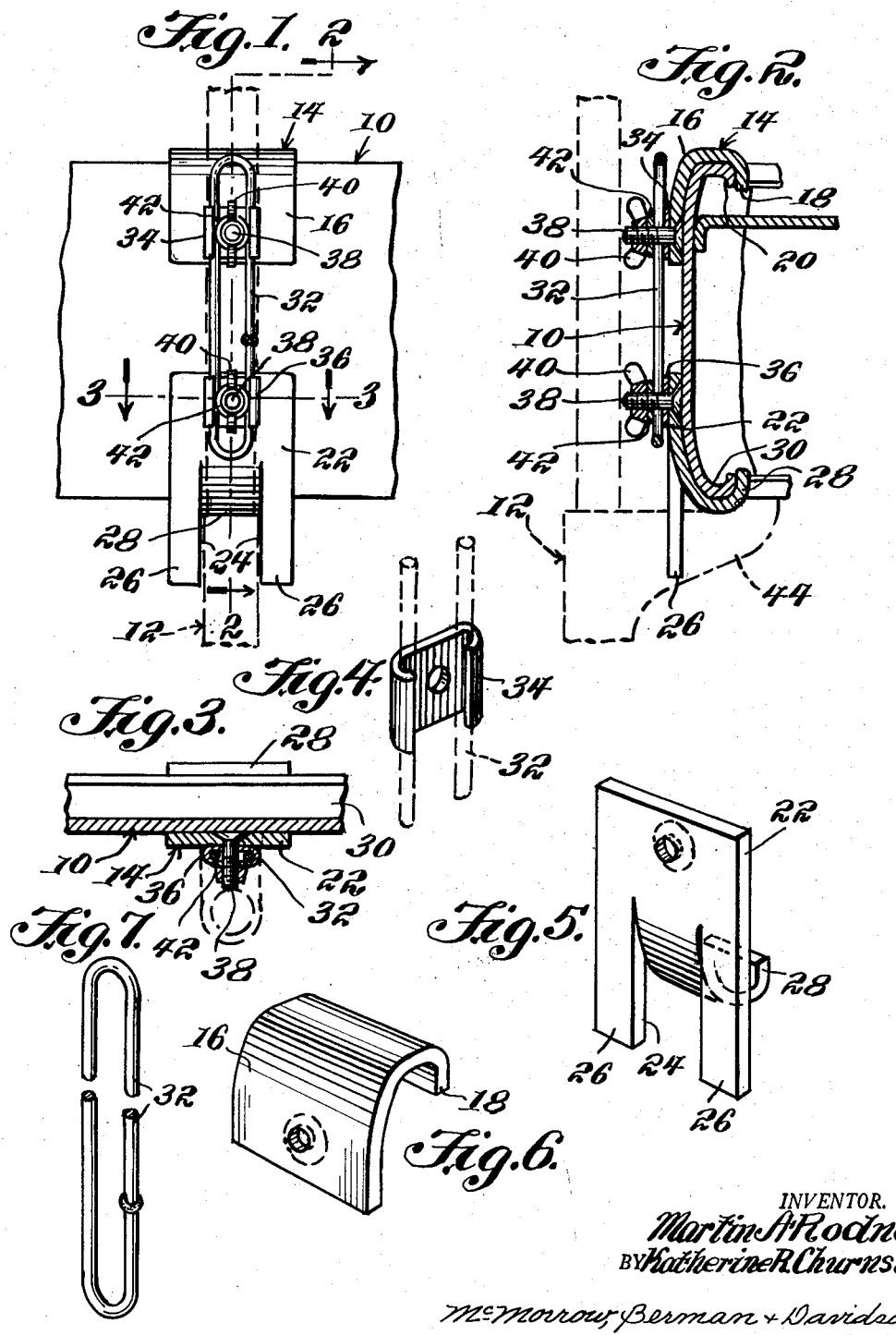
INVENTOR.
Martin A. Rodney,
BY Katherine R. Churnside,
McMorrow, Berman & Davidson
ATTORNEYS

United States Patent Office 2,764,446
Patented Sept. 25, 1956

2,764,446

BUMPER JACK SAFETY DEVICE

Katherine R. Churnside and Martin A. Rodney, Kingston, Pa.

Application August 21, 1953, Serial No. 375,595

2 Claims. (Cl. 293—69)

This invention relates to a device adapted to be associated with a conventional bumper jack, which device will be so designed as to be clampably engageable with a vehicle bumper to which the jack is applied, in a manner that will prevent slippage of the jack longitudinally of said bumper.

An important object of the present invention is to provide a device of the type stated which can be readily associated with a conventionally formed bumper and with a conventionally designed jack, to prevent relative slippage between the bumper and jack. It may be noted, in this regard, that when a bumper jack is used, it tends to elevate that portion of the bumper engaged thereby in such a manner as to dispose the bumper at a pronounced angle to the horizontal. As a result, in many instances the jack tends to slip longitudinally of the bumper, and it sometimes happens that the jack will slip to such an extent as to cause the vehicle to be lowered suddenly, thereby causing damage to the vehicle as well as, in many instances, injury to the user.

The main object of the present invention is, accordingly, to provide a safety device of the nature described that will be adapted to prevent slippage of the jack in either direction, longitudinally of the bumper.

Another object of importance is to provide a device as stated which can be readily connected to or disconnected from the bumper, the device being composed of adjustably connected components that are capable of being readily fitted to bumpers differing materially from one another in respect to the cross sectional configuration thereof and the distance between the top and bottom edges thereof.

Another object of importance is to provide a device as stated which will include a bumper-engaging member formed from a single piece of metal material having a forwardly and upwardly extended lip that fits about the bottom edge of the bumper, and depending projections or abutments located at opposite sides of the lip so as to straddle the bumper support hook of a conventional jack, the bumper support hook engaging under the lip and the abutment engaging opposite sides of the hook in a manner that will prevent the hook from slipping along the length of the bumper.

Another object of the importance is to provide a device of the type stated which, though efficiently adapted to prevent relative slippage between a jack and a bumper supported thereupon, will nevertheless be capable of manufacture at low cost, will be rugged, and will be composed of a minimum of parts simply arranged in a manner whereby they will not readily get out of order.

Other objects will appear from the following description, the claims appended thereto, and from the annexed drawing, in which like reference characters designate like parts throughout the several views, and wherein:

Figure 1 is a fragmentary elevational view of a vehicle bumper, a safety device formed in accordance with the present invention being shown in rear elevation applied to the bumper, a conventional bumper jack being illustrated in dotted outline in proper position relative to the safety device and bumper;

Figure 2 is a sectional view taken substantially on line 2—2 of Figure 1;

Figure 3 is a transverse sectional view taken substantially on line 3—3 of Figure 1;

Figure 4 is a perspective view of one of the plates carried by the safety device for engaging a flexible loop used in connecting the clamp members of the device, the loop being illustrated fragmentarily and in dotted outline;

Figure 5 is a perspective view of the lower clamp member of the device, per se;

Figure 6 is a perspective view of the upper clamp member per se; and

Figure 7 is a perspective view, portions being broken away, of the flexible connecting loop that extends between the clamp members.

The reference numeral 10 has been applied generally in the drawing to designate a conventional vehicle bumper, to which is applied a jack 12 having associated therewith a safety device 14 formed in accordance with the present invention.

The safety device includes an upper clamp member formed from a single piece of metal material designated by the reference numeral 16, said piece of metal material being bent, cast, or otherwise formed to include a generally flat body portion formed at its upper edge with a downwardly turned lip 18 that engages over the top flange 20 of the bumper 10. The upper clamp member thus has the cross sectional shape of an inverted J, this shape being found to be particularly well adapted to conform the upper clamp member to the cross sectional shapes of conventionally designed vehicle bumpers in present day use.

A lower clamp member has been designated by the reference numeral 22, and is shown to advantage in Figure 5. The lower clamp member is also formed from a flat piece of metal material, and has a flat body the lower end portion of which is provided with a pair of straight, parallel slits 24 located inwardly from the opposite side edges of the body. The slits 24 terminate medially between the top and bottom edges of the lower clamp member 22, so as to define at the lower end of the clamp member, a pair of depending projections or abutments 26, said abutments being disposed at opposite sides of a lip 28. Lip 28 is bent forwardly out of the general plane of the lower clamp member, and has its free edge portion turned upwardly to permit engagement of the lip under the bottom flange 30 of the bumper 10 (see Figure 2).

The upper and lower clamp members are adjustably connected, so as to permit the distance between the clamp members to be selected according to the width of the bumper to which the clamp members are to be applied. To this end, an endless loop 32 of flexible material such as heavy wire or cable is provided, said loop being designated by the reference numeral 32 and being of relatively elongated formation as best shown in Figure 1. The upper end portion of the loop 32 is engaged in an upper retaining plate 34 (Figure 4), said retaining plate being carried by the upper clamp member 16 and being provided with inwardly extended side flanges receiving the opposite side portions of the flexible loop. A lower retaining plate 36 is formed similarly to the upper retaining plate, and is carried by the lower clamp member 22 of the device. The plates 34, 36 have smooth walled openings registering with smooth walled, countersunk openings provided in the upper and lower clamp members, and extending through the registering openings are studs or screws 38, on which are threaded wing nuts 40. The nuts 40, when turned in the direction desired, either clamp the end portions of loop 32 to the retaining plates, or loosen said end portions relative to the retaining plates, as desired. Washers 42 are interposed between the end portions of the loop and the wing nuts, diametrically opposite portions of the washers being adapted to bind against transversely aligned portions of the loop, when the nuts 40 are threaded in the direction of their associated clamp members.

By reason of this arrangement, the upper and lower clamp members are adapted to be first engaged over the top and bottom edges of a bumper 10, with the nuts 40 loosened. Thereafter, the nuts 40 are tightened to secure the clamp members to the opposite edge portions of the bumper, without possibility of loosening of said clamp members after they are so secured.

The bumper jack 12 is now applied, the bumper support hook 44 thereof underlying the lip 28 of the lower clamp member as best shown in Figure 2. When the hook 44 is so positioned, the depending abutments or projections 26 will straddle the same as shown in Figure 1, thus to engage against opposite sides of the bumper support hook to hold the jack against slippage longitudinally of the bumper during use.

An efficiently acting safety device is thus provided, which will insure against relative slippage between the bumper and jack, said device being so designed as to be attachable to any of various bumpers differing from one another with respect to the cross sectional configuration and width thereof. The device, further, can be used without requiring modification or redesign either of the bumper or of the bumper jack.

It is believed apparent that the invention is not necessarily confined to the specific use or uses thereof described above, since it may be utilized for any purpose to which it may be suited. Nor is the invention to be necessarily limited to the construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A bumper engaging safety attachment for a ground supported jack having a laterally extending hook, comprising an upper clamp member arranged in an upright position, said member being formed at its upper edge with a downwardly turned lip for engagement over the top flange of a bumper, a lower clamp member arranged in an upright position positioned below and in alignment with said upper member, said lower member being formed at its lower end with a pair of depending abutments for receiving therebetween the hook of a jack and an upwardly turned lip between said abutments for engagement under the bottom flange of the bumper, an endless loop arranged in an upright position positioned on the side of said upper and lower clamp members remote from said lips, and separate attaching means for securing the upper portion of said loop to said upper member and the lower portion of said loop to said lower member.

2. A bumper engaging safety attachment for a ground supported jack having a laterally extending hook, comprising an upper clamp member arranged in an upright position, said member being formed at its upper edge with a downwardly turned lip for engagement over the top flange of a bumper, a lower clamp member arranged in an upright position positioned below and in alignment with said upper member, said lower member being formed at its lower end with a pair of depending abutments for receiving therebetween the hook of a jack and an upwardly turned lip between said abutments for engagement under the bottom flange of the bumper, an endless loop arranged in an upright position positioned on the side of said upper and lower clamp members remote from said lips, and separate attaching means for securing the upper portion of said loop to said upper member and the lower portion of said loop to said lower member, said means embodying a retaining plate embracing the adjacent leg portions of said loop, and a nut and bolt assembly securing said retaining plate to the adjacent clamping member.

References Cited in the file of this patent

UNITED STATES PATENTS

| | | |
|---|---|---|
| 1,680,469 | Morgan | Aug. 14, 1928 |
| 2,162,100 | McGregor | June 13, 1939 |
| 2,164,621 | Pfauser | July 4, 1939 |
| 2,217,317 | McNally et al. | Oct. 8, 1940 |
| 2,456,375 | Cedarholm | Dec. 14, 1948 |
| 2,529,686 | Green | Nov. 14, 1950 |
| 2,616,746 | Chapman | Nov. 4, 1952 |